(12) United States Patent
Shi et al.

(10) Patent No.: US 10,002,142 B2
(45) Date of Patent: Jun. 19, 2018

(54) METHOD AND APPARATUS FOR GENERATING SCHEMA OF NON-RELATIONAL DATABASE

(71) Applicant: International Business Machines Corporation, Armonk, NY (US)

(72) Inventors: Ju Wei Shi, Beijing (CN); Chen Wang, Beijing (CN); Lan Jun Wang, Beijing (CN); Jia Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 14/038,236

(22) Filed: Sep. 26, 2013

(65) Prior Publication Data

US 2014/0095549 A1    Apr. 3, 2014

(30) Foreign Application Priority Data

Sep. 29, 2012    (CN) .......................... 2012 1 0379457

(51) Int. Cl.
*G06F 17/30*    (2006.01)

(52) U.S. Cl.
CPC .............................. *G06F 17/30292* (2013.01)

(58) Field of Classification Search
None
See application file for complete search history.

(56) References Cited

U.S. PATENT DOCUMENTS

| 5,956,499 | A  | * | 9/1999  | Colgan  | 703/2 |
| 7,016,906 | B1 | * | 3/2006  | Janzig  | G06F 17/30607 |
| 7,249,135 | B2 |   | 7/2007  | Ma et al. | |
| 8,122,061 | B1 | * | 2/2012  | Guinness | 707/802 |
| 8,631,048 | B1 | * | 1/2014  | Davis et al. | 707/803 |
| 8,862,588 | B1 | * | 10/2014 | Gay | G06F 17/30336 707/741 |
| 2003/0101166 | A1 | * | 5/2003  | Uchino et al. | 707/2 |
| 2005/0091237 | A1 |   | 4/2005  | Bakalash et al. | |
| 2005/0149552 | A1 | * | 7/2005  | Chan et al. | 707/102 |
| 2007/0055655 | A1 |   | 3/2007  | Bernstein et al. | |
| 2009/0254576 | A1 | * | 10/2009 | Baris et al. | 707/101 |

(Continued)

FOREIGN PATENT DOCUMENTS

| WO | WO2012/083679 A1 | 6/2012 | |
| WO | WO 2012131310 A1 | * 10/2012 | G06F 17/2247 |

OTHER PUBLICATIONS

Olivier Cure, et al., Ontology based data integration over document and column family oriented NOSQL stores. SSWS (Oct. 2011).

(Continued)

*Primary Examiner* — Aleksandr Kerzhner

*Assistant Examiner* — Eddy Cheung

(74) *Attorney, Agent, or Firm* — David M. Quinn; Michael J. Chang, LLC

(57) ABSTRACT

Embodiments of the present invention disclose a method and apparatus for generating a schema of a non-relational database. In the embodiments of the present invention, relationship among keys in at least one entry of a non-relational database may be determined, the keys may be grouped into at least one group based on the determined relationship, and a schema of the non-relational database may be generated according to the at least one group.

20 Claims, 8 Drawing Sheets

(56) References Cited

U.S. PATENT DOCUMENTS

| | | | | |
|---|---|---|---|---|
| 2009/0271419 | A1* | 10/2009 | Bornhoevd et al. | 707/100 |
| 2009/0300043 | A1* | 12/2009 | MacLennan | 707/102 |
| 2010/0241639 | A1* | 9/2010 | Kifer et al. | 707/754 |
| 2011/0225167 | A1* | 9/2011 | Bhattacharjee | G06F 17/30595 707/747 |
| 2011/0231454 | A1* | 9/2011 | Mack | 707/803 |
| 2012/0158655 | A1* | 6/2012 | Dove et al. | 707/627 |
| 2013/0262522 | A1* | 10/2013 | van Rotterdam et al. | 707/802 |
| 2014/0032502 | A1* | 1/2014 | Kraley | G06F 17/2288 707/663 |

OTHER PUBLICATIONS

Xiao Li et al., An ontology-based mapping repository for dynamic and customized data integration, CISE Technical Report (Dec. 5, 2009).

Erhard Rahm et al., "A survey of approaches to automatic schema matching," the VLDB Journal 10: 334-350 (Nov. 2001).

Li Qian, et al., "Sample-driven schema mapping," SIGMOD '12, May 20-24, 2012, Scottsdale, Arizona.

* cited by examiner

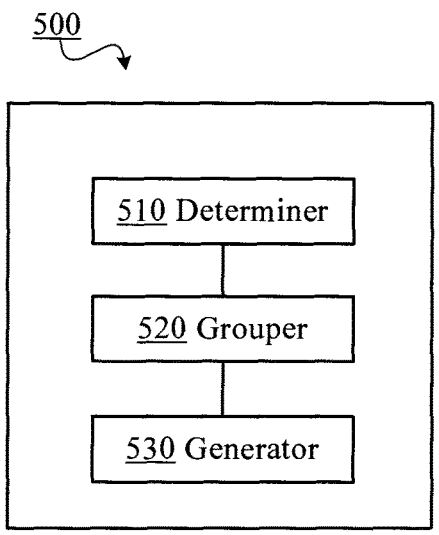

Fig. 5

{author: 'don', created: new Date('03/27/2009'), Title: 'yet another blog post', Text: 'Here is the text...', tags:['example', 'don'], comments: [{author: 'mary', comment: 'I disagree'}, {author: 'alice', comment: 'good post'}]}

...

{author: 'joe', created: new Date('03/28/2009'), Title: 'yet another blog post', Text: 'Here is the text...', tags:['example', 'joe'], mood:'happy', comments: [{author: 'jim', comment: 'I disagree'}, {author: 'nancy', comment: 'good post'}]}

...

{author:{name: 'jason', department:' IT', age: 33, sex: 'male'}, created: new Date('10/23/2011'), Title: 'yet another blog post', Text: 'Here is the text...', tags:['example', 'jason'], comments: [{author:{ name:'mandy', department:'Sales', age: 30, sex:'female'}, comment: 'I disagree'}, {author: {name:'laura', department:'Marketing', sex: 'female' }, comment: 'good post'}]}

METHOD AND APPARATUS FOR GENERATING SCHEMA OF NON-RELATIONAL DATABASE

TECHNICAL FIELD

Embodiments of the present invention relate to the field of database, and more specifically, to a method and apparatus for generating a schema of a non-relational database.

BACKGROUND

As is well known in the art, databases play an important role in modern information technology. For example, as one of significant types of databases, relational database systems are widely used for storing and retrieving various types of information. However, in currently ever-advancing information technology, there are demands for high-concurrency read/write of databases, demands for high-efficiency storage and access of mass data, and demands for high scalability and high usability of databases. In this regard, relational databases have many insurmountable problems. For example, relational databases are not suitable to cope with Web2.0 websites, especially Web2.0 purely dynamic websites of a super-large and high-concurrency SNS type.

In this view, the art has proposed non-relational databases (NoSQL). Non-relational databases are characterized by self-organization, self-management, low cost, high scalability, high concurrency, simple query relation and so on. Specifically, a table in a relational database usually stores a formatted data structure, wherein the composition of each entry field is identical, and even if not every entry needs all fields, the relational database still allocates all fields to each entry. Hence, such a structure is a factor behind the performance bottleneck of relational databases. Unlike a relational database, a non-relational database performs storage in the form of key/value pairs, its structure is not fixed, and each entry may have distinct fields and add some own key/value pairs according to needs. Hence, non-relational databases are not limited to fixed structures, which may reduce some temporal and spatial overheads.

Currently, since non-relational databases have no schema similar to relational databases, it is impossible to perform processing, such as data matching, data integration, data exchange and the like, on relational databases and non-relational databases according to schemas, and further, it is impossible to integrate relational databases and non-relational databases.

SUMMARY

In view of the above problems existing in the prior art, there is in the art a need for a solution capable of obtaining a schema in a non-relational database. To this end, the embodiments of the present invention provide a method and apparatus for generating a schema of a non-relational database.

According to one aspect of the present invention, there is provided a method for generating a schema of a non-relational database. The method may include: determining relationship among keys in at least one entry of a non-relational database; grouping the keys into at least one group based on the determined relationship; and generating a schema of the non-relational database according to the at least one group.

According to another aspect of the present invention, there is provided an apparatus for generating a schema of a non-relational database. The apparatus may comprise: a determiner configured to determine relationship among keys in at least one entry of a non-relational database; a grouper configured to group the keys into at least one group based on the determined relationship; and a generator configured to generate a schema of the non-relational database according to the at least one group.

As to be understood through the following description, with the embodiments of the present invention, Schema of NoSQL may be generated efficiently and conveniently, thereby facilitating processing, such as data matching, data integration and data exchange, to be performed with respect to a relational database and a non-relational database.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 5 shows a schematic block diagram of an apparatus 500 for generating a schema of a non-relational database according to one exemplary embodiment of the present invention;

FIG. 6 shows a schematic view of a non-relational database 600 according to one embodiment of the present invention;

DETAILED DESCRIPTION

Figure 1:
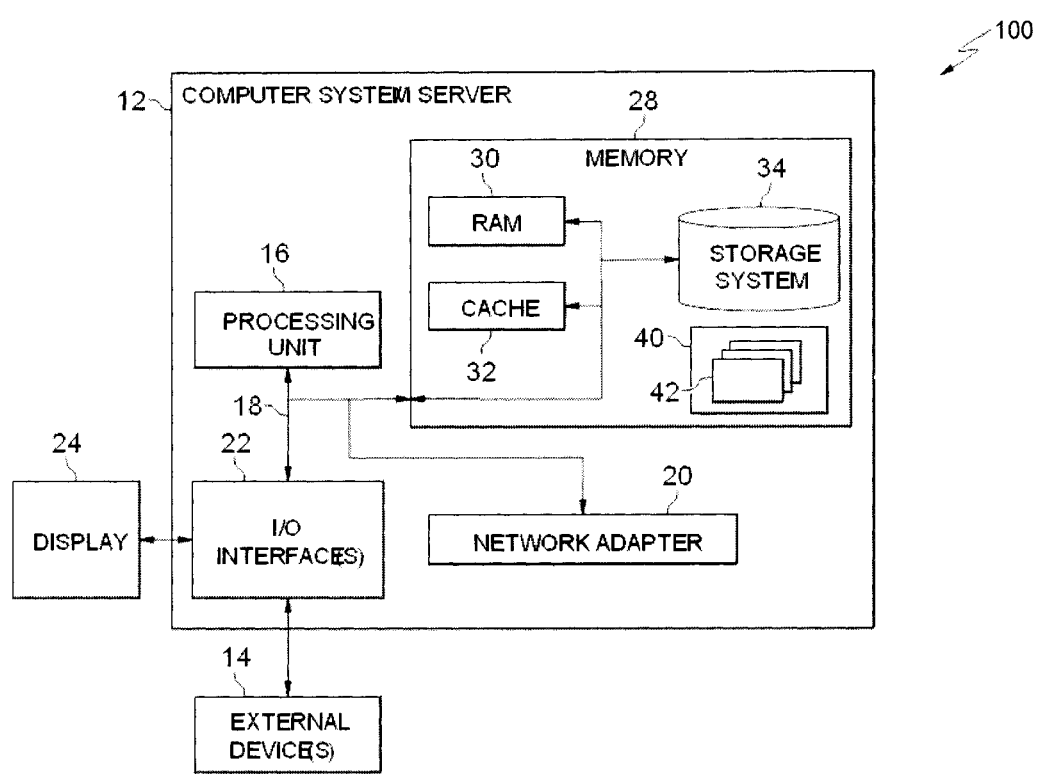
FIG. 1 shows an exemplary computer system 100 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the embodiments of the present invention, an "entry" may be a record in a non-relational database or may be regarded as a data object instance in a non-relational database. One entry may have a unique identifier (ID) and may contain no or more key/value pairs. According to the embodiments of the present invention, various key/value pairs may be distinguished by predefined distinguishers; for example, different key/value pairs may be distinguished by commas, etc. In the meanwhile, "key" and "value" in each key/value pair may be separated by a predefined separator, e.g., a colon, so that the "key" in a key/value pair may be determined according to a separator. In addition, the "value" in a key/value pair may be extended by a predefined extender; for example, brackets may be used to represent that the "value" in a key/value pair contains more than two attributes. Each of the more than two attributes may be a real "value" or a key/value pair, and the "value" in the key/value pair may further contain one or more attributes. Moreover, two or more key/value pairs may be grouped using a grouping symbol, e.g., braces.

FIG. 6 shows a schematic view of a non-relational database 600 according to one embodiment of the present invention. As shown in FIG. 6, non-relational database 600 may contain a plurality of records each representing an entry. Non-relational database 600 may have an identifier so as to characterize itself and distinguish itself from other non-relational databases. For example, the identifier of non-relational database 600 may be "Biog." According to the embodiments of the present invention, the identifier of the non-relational database may be regarded as a key. Hence, while building hierarchical information of respective keys, the identifier may be considered as a key in hierarchical information. With reference back to FIG. 6, in an entry corresponding to the first record, "author: 'don'" is a key/value pair, wherein the key is "author" and the value is "don." In addition, in the entry, "comments: [{author: 'mary', comment:'I disagree'}, {author:'alice', comment: 'good post'}]" is also a key/value pair, wherein the key is "comments," and the value is "[{author:'mary', comment:'I disagree'}, {author:'alice', comment: 'good post'}]". It can be seen that this value may further nest one or more key/value pairs. According to the distinguisher, separator and extender, hierarchical information of each key may be determined and association relationship among keys may be determined accordingly.

In some embodiments according to the present invention, the relationship among keys may comprise association relationship among the keys. In other embodiments according to the present invention, the relationship among keys may further comprise association degree of keys. In the above example, the value corresponding to the key "comments" nests two keys, "author" and "comment." Thus for these three keys, the key "comments" and the key "author" have association relationship, and the key "comments" and the key "comment" also have association relationship. Meanwhile, in this entry the key "comments" and the key "author" co-occur twice, so it may be considered that the association degree of the key "comments" and the key "author" is 2.

With flowcharts shown in FIGS. 2-4 below, an introduction is given to a method for generating a schema of a non-relational database according to the embodiments of the present invention. Those skilled in the art would readily appreciate that the technical solution proposed by the present invention is not limited to concrete embodiments shown in these figures, which embodiments are merely exemplary rather than limiting.

Figure 2:
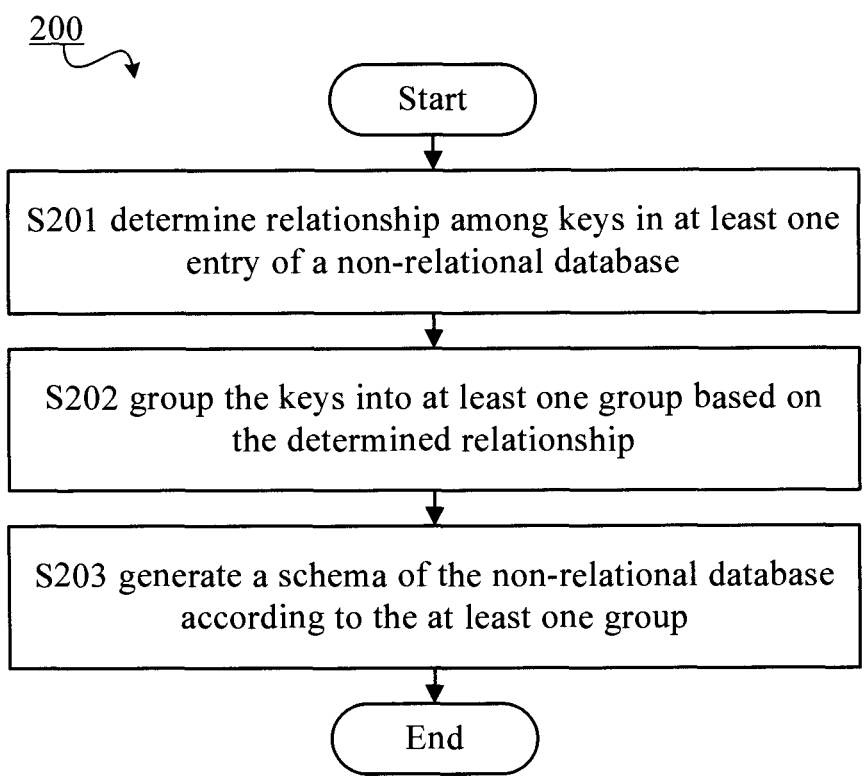
FIG. 2 shows a schematic flowchart of a method 200 for generating a schema of a non-relational database according to one exemplary embodiment of the present invention.

FIG. 2 shows a schematic flowchart of a method 200 for generating a schema of a non-relational database according to one exemplary embodiment of the present invention.

In step S201, relationship among keys in at least one entry in a non-relational database is determined.

According to the embodiments of the present invention, the relationship among keys in an entry in a non-relational database may be determined in various manners. In one embodiment according to the present invention, key(s) contained in each of the entries in a non-relational database is extracted, hierarchical information of the extracted key(s) in each entry is determined, and association relationship among keys is determined according to the hierarchical information. In one embodiment according to the present invention, key(s) contained in each of part of entries (e.g., one or more entries selected according to a certain predetermined criterion or condition) in a non-relational database may be extracted, hierarchical information of the extracted key(s) in each entry is determined, and association relationship among keys is determined according to the hierarchical information. Hereinafter, this embodiment will be described in more detail in conjunction with FIG. 3.

In step S202, the keys are grouped into at least one group according to the determined relationship.

According to the embodiments of the present invention, the grouping of the keys into at least one group according to the determined relationship may be implemented in various manners. In one embodiment of the present invention, the association relationship among keys may be extracted from the determined relationship, and keys with the association relationship are grouped to one group. Hereinafter, this embodiment will be described in more detail in conjunction with FIG. 3.

In step S203, a schema of the non-relational database is generated according to the at least one group.

According to the embodiments of the present invention, a schema of the non-relational database may be generated in various manners. In one embodiment according to the present invention, an effective group and its weight in the at least one group may be obtained, and a schema of the non-relational database may be generated based on the effective group and its weight.

In one embodiment according to the present invention, the obtaining of an effective group and its weight in the at least one group may be implemented in various manners. For example, repetitive groups in the at least one group may be determined; repetitive groups are set as an effective group, and a weight of the effective group obtained as such is set as the number of the repetitive group; meanwhile, a non-repetitive group is set as an effective group, and a weight of the effective group is set as a preset weight. According to the embodiments of the present invention, the preset weight may be 1 for example.

In one embodiment according to the present invention, an effective group whose weight is less than a predetermined weight threshold may be filtered out, so effective group(s) with a larger weight is used to generate a schema of the non-relational database. For example, a weight of each effective group may be compared with the predetermined weight threshold, one or more target groups are selected from effective groups according to results of comparison, and a schema of the non-relational database is generated based on the selected target groups. With this implementation, some keys with lower frequency may be filtered out, so that it is avoided that the scale of the schema generated for the non-relational database is too large.

With the steps shown in steps S201-S203, the embodiments of the present invention may generate a schema of NoSQL, which facilitates those skilled in the art to understand a structure of a non-relational database and promotes processing, such as data matching, data integration and data exchange, to be performed on a relational database and a non-relational database.

Furthermore, in real applications, entries or data objects of a non-relational database are usually stored in a given temporal order, and these entries or data objects might be set with a timestamp or other time mark. According to a further embodiment of the present invention, one or more intermediate schemas may be generated for the non-relational database based on the temporal order information or timestamp (e.g., 1 day, 2 days, 1 week or other appropriate time period), and then a more accurate and comprehensive schema is generated for the non-relational database according to relationship among these intermediate schemas.

In one embodiment according to the present invention, in step S201, a timestamp of each of the at least one entry may be determined, the at least one entry in NoSQL is classified according to the determined timestamp, keys contained in each entry in each class is extracted, and association relationship among the keys in each class is determined. In step S202, the keys in each class are grouped into at least one group based on the association relationship among the keys in each class. In step S203, a schema associated with each class is generated according to the at least one group into which keys in each class are grouped, and schemas whose similarity is larger than a predetermined similarity threshold are merged. In this way, a schema for the non-relational database may be determined according to several intermediate schemas that evolve with time. Hereinafter, this embodiment will be described in more detail in conjunction with FIG. 4.

According to the embodiments of the present invention, a historical schema of the non-relational database, e.g., a schema generated for the non-relational database at a certain time period or moment may be obtained further, and then the schema generated according to steps S201-S203 and the historical schema may be merged according to the similarity between them or according to a timestamp of the generated schema and a timestamp of the historical schema. In one embodiment, the similarity between the generated schema and the historical schema may be calculated, and the generated schema and the historical schema may be merged when the similarity is larger than a predetermined threshold. In this manner, schemas with large difference may not be merged, so that operational overheads are saved, the processing efficiency is increased, and the evolution of schemas may be intuitively provided to users. In another embodiment, a timestamp associated with the generated schema (e.g., a time period during which the schema is generated) may be determined first, a timestamp associated with the historical schema is determined at the same time, and then these two timestamps are compared. If the difference between these two timestamps is less than a predetermined threshold, i.e., the time interval of generation of these two schemas is relatively short, then the generated schema and the historical schema may be merged.

Figure 3:
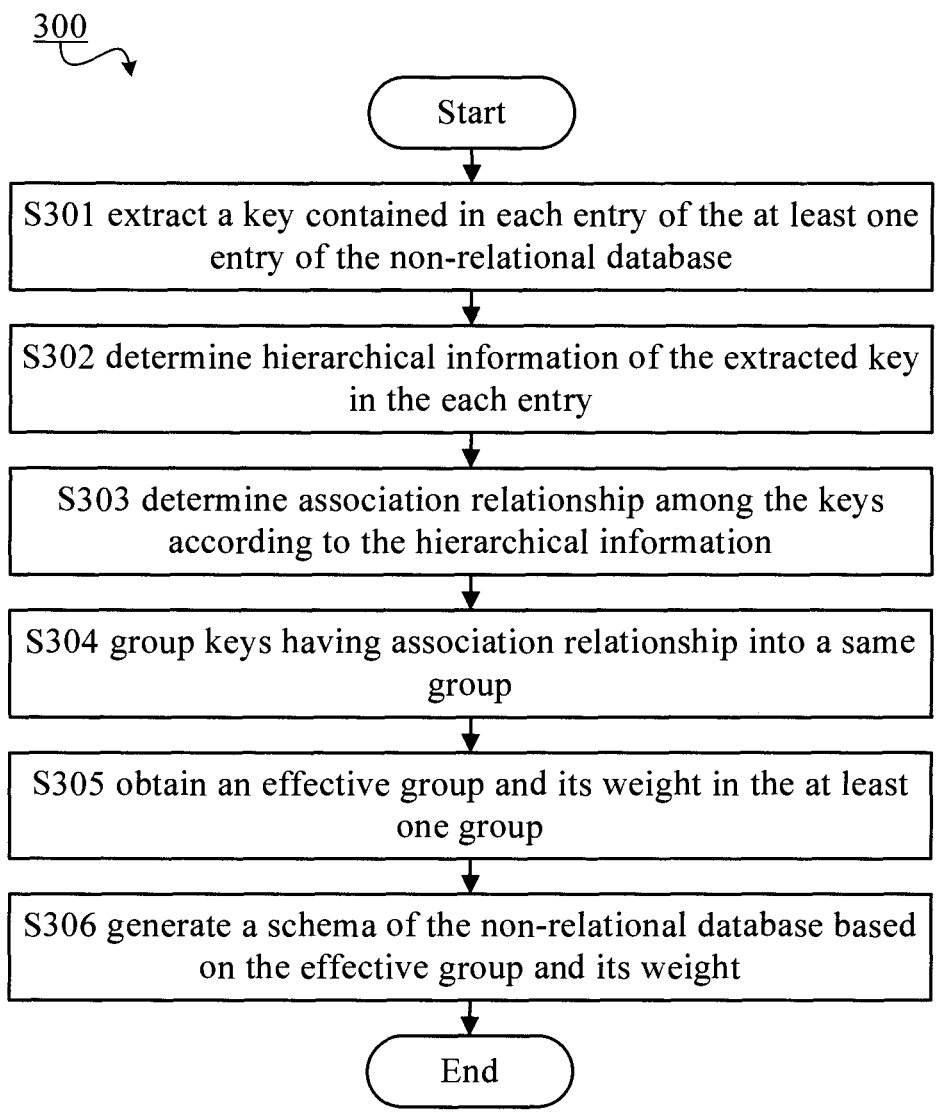
FIG. 3 shows a schematic flowchart of a method 300 for generating a schema of a non-relational database according to one exemplary embodiment of the present invention.

FIG. 3 shows a schematic flowchart of a method 300 for generating a schema of a non-relational database according to one exemplary embodiment of the present invention. The embodiment shown in FIG. 3 is an implementation of the method shown in FIG. 2.

In step S301, a key contained in each of at least one entry in a non-relational database is extracted.

According to the embodiments of the present invention, the non-relational database may comprise at least one entry. An entry set may be first selected from the at least one entry, and then the key/value pairs are contained in each entry in the entry set may be determined, and then keys are extracted from the determined key/value pairs, so that keys in each entry in the entry set are extracted. When the entry set contains all entries in the non-relational database, the extracted keys are keys contained in each entry in the non-relational database.

In the exemplary non-relational database shown in FIG. 6, different key/value pairs are distinguished by commas, and the "key" and "value" in each key/value pair are separated by a colon. Hence, the following keys contained in the first entry of the non-relational database may be extracted: "author", "created", "Title", "Text", "tags", "comments" and "comment". Similarly, keys contained in the $2^{nd}$, $3^{rd}$, ..., $N^{th}$ entry in the non-relational database may be extracted respectively.

In step S302, hierarchical information of the extracted key in each entry is determined.

Figure 7:
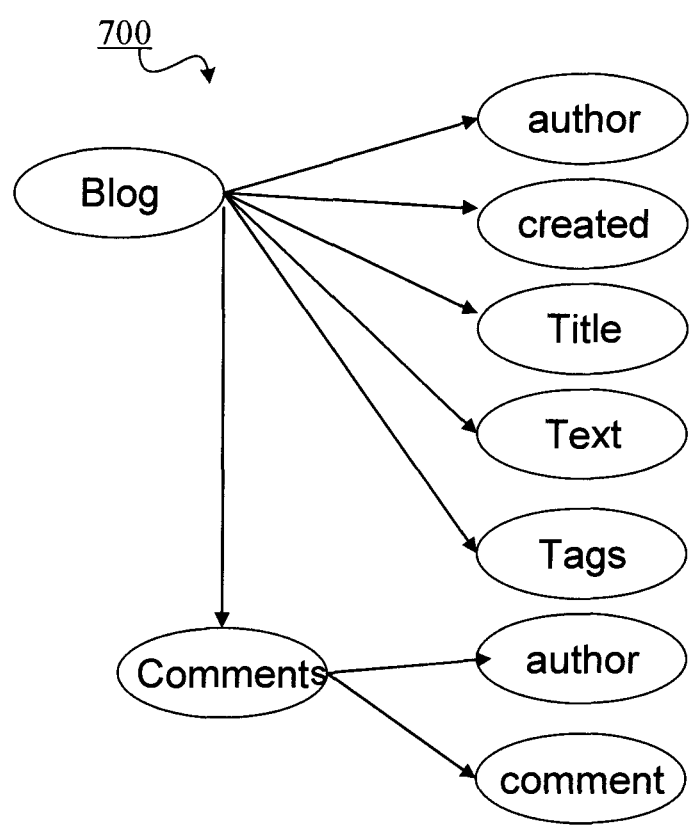
FIG. 7 shows a schematic view of hierarchical information 700 according to one embodiment of the present invention.

According to the embodiments of the present invention, hierarchical information of various keys may be determined according to distinguishers, separators, extenders, grouping symbols, etc., so that association relationship among the various keys is determined. Distinguishers, separators, extenders and grouping symbols may be predefined. In the exemplary non-relational database shown in FIG. 6, commas are used as the distinguisher by way of example, colons are used as the separator by way of example, brackets are used as the extender by way of example, and braces are used as the grouping symbol by way of example. Thus, hierarchical information of various keys in an entry may be determined according to the appearance of these symbols. Regarding the example of the first entry of the non-relational database (for example, named "Blog") shown in FIG. 6, hierarchical information of keys may be determined. FIG. 7 shows a schematic view of hierarchical information 700 according to one embodiment of the present invention, wherein one node corresponds to one key.

In step S303, association relationship among keys is determined according to the hierarchical information.

In the schematic view of hierarchical information shown in FIG. 7, hierarchical information of keys extracted in step S301, such as "author", "created", "Title", "Text", "tags", "comments" and "comment", are shown in a tree structure. Suppose "Blog" is a root node, the keys "author", "created", "Title", "Text", "tags" and "comments" are first-level child nodes of the root node; the first-level child node "comments" has two child nodes, namely "author" and "comment", which are second-level child nodes of the root node.

According to the embodiments of the present invention, the first-level child node is a child node that has direct association relationship with the root node, the second-level child node is a child node that has direct association relationship with the first-level child node, and so on and so forth, the $N^{th}$-level child node is a child node that has direct association relationship with the $N-1^{th}$ child node. For example, in the first entry, keys like "author", "created", "Title", "Text", "tags" and "comments" have direct association relationship with the non-relational database and thus are first-level child nodes; since the values corresponding to the key "comments" contain {author: 'mart', comment: 'I disagree'} and {author: 'alice', comment: 'good post'}, the keys "author" and "comment" contained in the values have direct association relationship with the key "comments" but not with the root node, the keys "author" and "comment" are second-level child nodes.

It can be seen that the association relationship among various child nodes may be determined according to the hierarchical information obtained in step S302, so that the association relationship among various keys may be determined accordingly.

In step S304, keys having association relationship are grouped to the same group.

According to the embodiments of the present invention, there are various solutions for grouping keys that have association relationship to the same group. In some embodiments according to the present invention, one or more paths may be determined according to hierarchical information of keys, and keys having the association relationship are grouped to the same path to perform the grouping step. For example, in FIG. 7, grouping may be implemented with respect to each path, wherein each path may comprise several levels of child nodes, each path starts from a root node and ends at an end leaf node, i.e., the last-level child node, and the paths should not be completely identical to each other. In the schematic view shown in FIG. 7, "Blog" and "created" may be grouped to a group, constituting a path Blog→created; "Blog", "Comments" and "author" may be grouped to a group, constituting a path Blog→Comments→author; "Blog", "Comments" and "comment" may be grouped to a group, constituting a path Blog→Comments→comment, and so on, which is not detailed here.

In some embodiments according to the present invention, one or more codewords may be determined according to hierarchical information of keys, each codeword comprises one or more keys in association relationship, and these keys in the association relationship may be separated by a predefined separation identifier so as to be distinguished from each other. For example, regarding the hierarchical information shown in FIG. 7, "Blog" and "created" may be grouped to a group, constituting a codeword, for example, "Blog.created". According to the embodiments of the present invention, each key may be represented using a simple or distinguishable mark. For example, the key "Blog" may be represented by a letter "A," and the key "created" may be represented by a letter "B," thus the above codeword may be denoted as "A.B" for short. In another example, "Blog", "Comments" and "author" may be grouped to a group, constituting a codeword, for example, "Blog.Comments.author". When the key "Comments" is represented by a letter 'C' and the key "author" is represented by a letter 'D," the above codeword may be denoted as "A.C.D" for short.

Figure 8A:
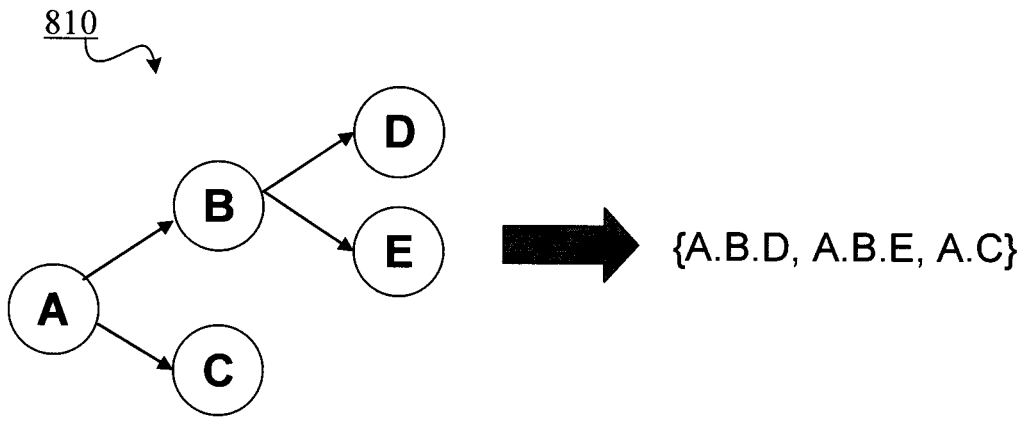
FIG. 8A shows a schematic view of a procedure 810 for grouping keys into groups according to hierarchical information of the keys according to one embodiment of the present invention.

FIG. 8A shows a schematic view of a procedure 810 for grouping keys into groups according to hierarchical information of the keys according to one embodiment of the present invention. In hierarchical information shown in FIG. 8A, nodes corresponding to keys are represented by A, B, C, D and E, respectively. According to the shown hierarchical information, keys are grouped into three groups, thereby three codewords "A.B.D," "A.B.E" and "A.C", as shown in FIG. 8A, are obtained.

Figure 8B:
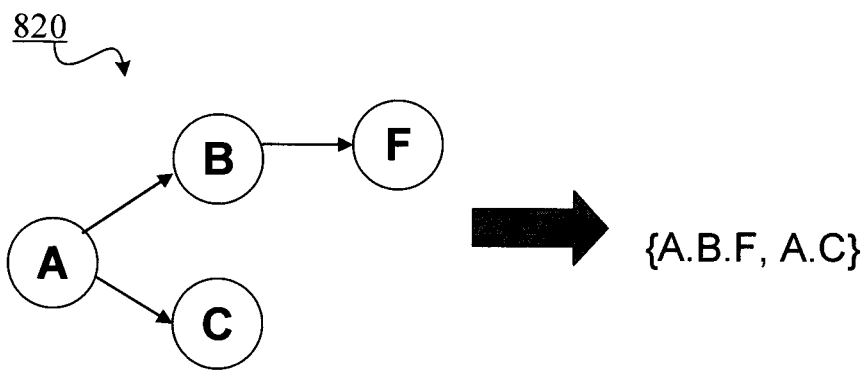
FIG. 8B shows a schematic view of a procedure 820 for grouping keys into groups according to hierarchical information of the keys according to one embodiment of the present invention.

FIG. 8B shows a schematic view of a procedure 820 for grouping keys into groups according to hierarchical information of the keys according to another embodiment of the present invention. In hierarchical information shown in FIG. 8B, nodes corresponding to keys are represented by A, B, C and F, respectively. According to the shown hierarchical information, keys may be grouped into two groups, thereby two codewords "A.B.F" and "A.C" shown in FIG. 8B are obtained.

In step S305, an effective group and its weight in the groups are obtained.

In this step, first statistics is made as to which of the groups obtained in step S304 are repetitive groups. Then, these repetitive groups may be determined as an effective group whose weight is the number of these repetitive groups. Meanwhile, each non-repetitive group may be determined as an effective group whose weight is a preset weight, for example, 1.

According to the embodiments of the present invention, for N groups, if they contain the same keys and these keys have the same relationship, it may be considered that the N groups are repetitive. At this point, the N groups may be merged or reduced to one group as an effective group; meanwhile, a weight of the effective group may be determined as N, wherein N is an integer larger than 1. For example, among codewords (groups) in FIGS. 8A and 8B, "A.C" appears twice, that is, among the plurality of groups being shown there is a group that has repeated twice. Thus, these two codewords may be merged, thereby obtaining an effective group "A.C"; meanwhile, according to the appearance frequency of the codeword "A.C," it can be determined that a weight of this codeword is 2. In addition, regarding the codewords "A.B.D," "A.B.E" and "A.B.F" shown in FIGS. 8A and 8B, since these codewords each appear only once, they are non-repetitive groups and they do not need to be merged. Accordingly, it may be determined that the weight of each of them is 1.

In step S306, a schema of the non-relational database is generated based on the effective group and its weight.

Figure 8C:
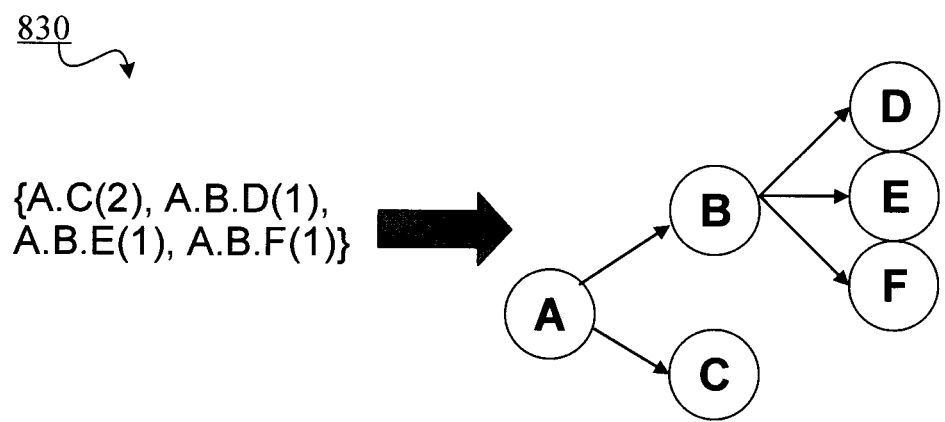
FIG. 8C shows a schematic view of a procedure 830 for generating a schema of a non-relational database according to groups according to one embodiment of the present invention.

FIG. 8C shows a schematic view of a procedure 830 for generating a schema of a non-relational database according to groups according to one embodiment of the present invention. In FIG. 8C, on the left of the arrow there are effective groups and their weights obtained in step S305, among which "A.C(2)" represents a group (or codeword) "A.C" with a weight of 2, "A.B.D(1)" represents a group "A.B.D" with a weight of 1, "A.B.E(1)" represents a group "A.B.E" with a weight of 1, and "A.B.F(1)" represents a group "A.B.F" with a weight of 1. According to these groups on the left of the arrow, a graph may be determined, as shown by a tree structure on the right of the arrow in FIG. 8C. Thus, a schema of the non-relational database is determined.

According to the embodiments of the present invention, while executing step S306, effective groups may be filtered so as to select a desired effective group as a target group, and then the schema of the non-relational database is generated using the selected target group rather than all effective groups. A weight of each effective group may be compared with a predetermined weight threshold, wherein the predetermined weight threshold may be set according to design demands or empirical values. In one implementation, the predetermined weight threshold may be set as 1 for example; if a weight of an effective group is larger than 1, then this effective group may be used for building the schema of the non-relational database subsequently.

Figure 4:
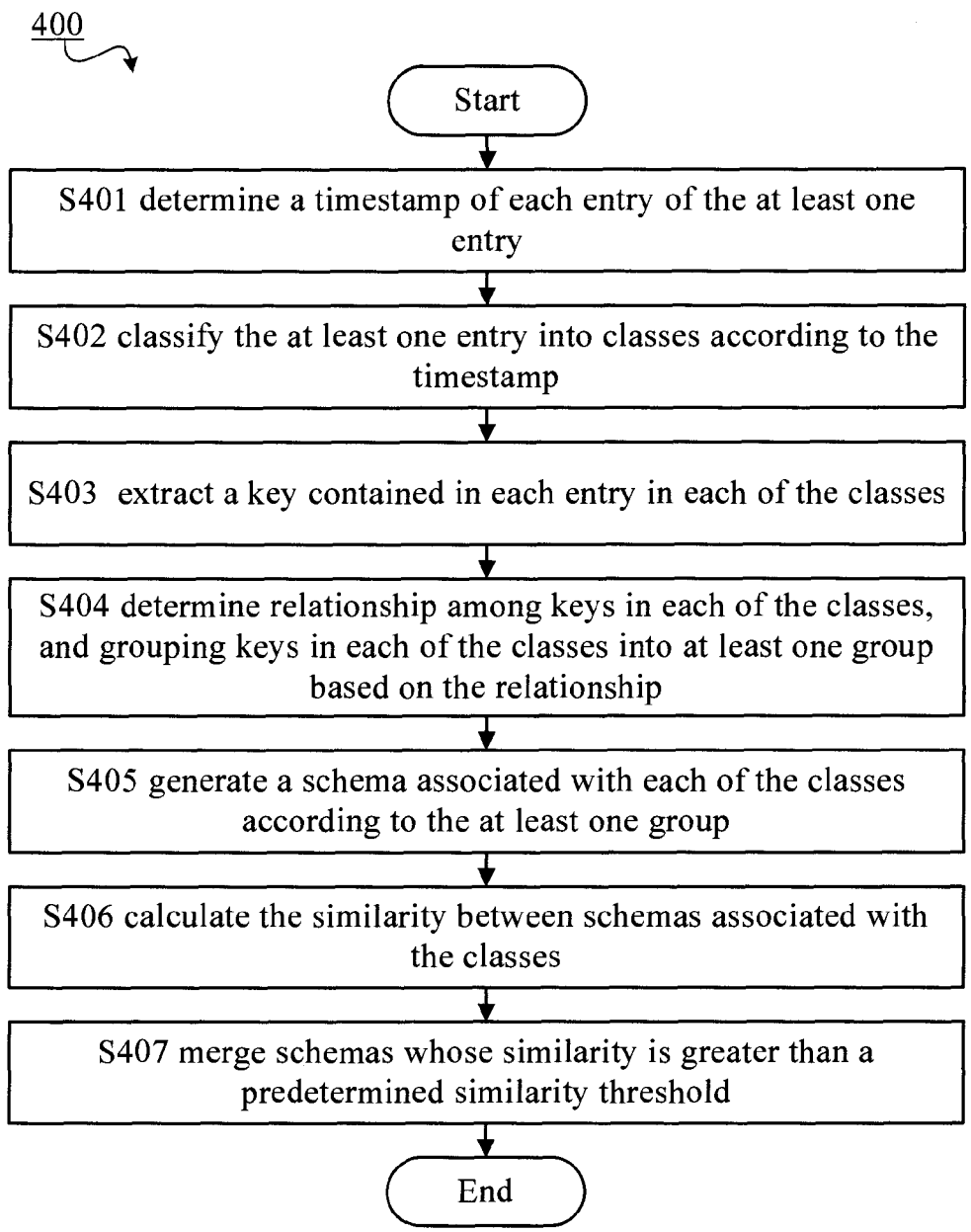
FIG. 4 shows a schematic flowchart of a method 400 for generating a schema of a non-relational database according to one exemplary embodiment of the present invention.

FIG. 4 shows a schematic flowchart of a method 400 for generating a schema of a non-relational database according to one exemplary embodiment of the present invention. The embodiment shown in FIG. 4 is an embodiment of the method shown in FIG. 2. In the embodiment shown in FIG. 4, data in the non-relational database may be classified according to a predetermined condition (e.g., a time period when data is generated), and the method is applied to data in each class, thereby obtaining a schema associated with each class; then, these schemas may be merged according to relationship among them (e.g., whether these schemas are similar to each other), thereby obtaining a more perfect and comprehensive non-relational database schema.

In step S401, a timestamp of each of at least one entry in the non-relational database is determined.

In the current non-relational database, typically each entry will be allocated with a time flag or an identifier related to the time when this entry is generated. According to the embodiments of the present invention, the term "timestamp" is used for representing the time flag or identifier related to the time when this entry is generated. Those skilled in the art would appreciate that the data "timestamp" used here is not necessarily a specific of fixed form, but may be any other appropriate form that is commonly used in the art.

In step S402, the at least one entry is classified into classes according to the timestamp.

Figure 9:
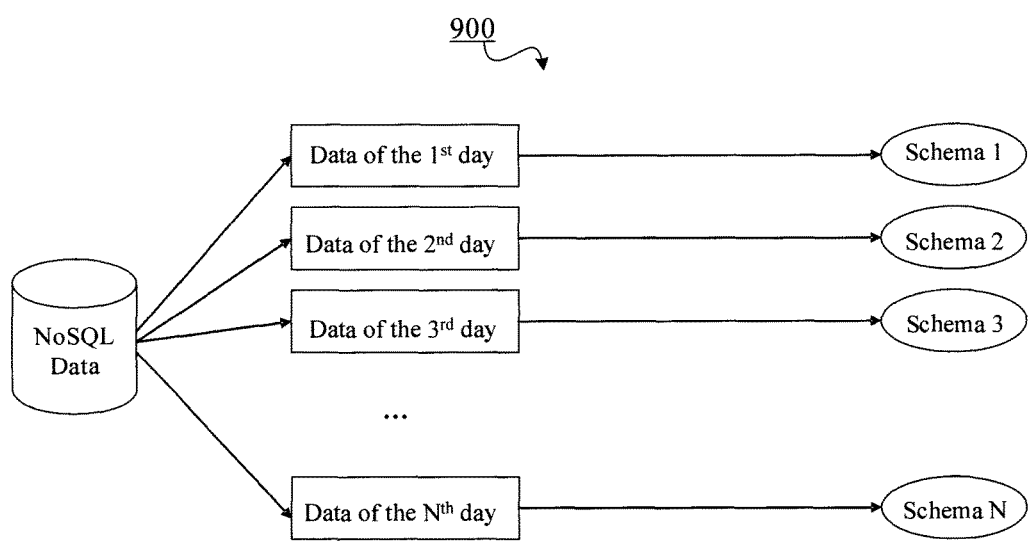
FIG. 9 shows a schematic view of a procedure 900 for generating a schema of a non-relational database according to one embodiment of the present invention.

FIG. 9 shows a schematic view of a procedure 900 for generating a schema of a non-relational database according to one embodiment of the present invention. The exemplary non-relational database contains NoSQL data which is stored in the database in the form of entries. According to the embodiments of the present invention, entries with the same or similar timestamp may be classified into one class; for example, the $1^{st}$ entry to the $5^{th}$ entry are all data generated on the first day, so these 5 entries may be classified into one class, which is represented by, for example, "data of the first day" in FIG. 9. In addition, "data of the second day" is also a class, which may comprise the $100^{th}$ entry to the $200^{th}$ entry in the non-relational database; "data of the $3^{rd}$ day" may comprise the $20^{th}$ entry to the $35^{th}$ entry in the non-relational database, and so on and so forth . . . ; "data of the $N^{th}$ day" might comprise the $1000^{th}$ entry to the $2000^{th}$ entry in the non-relational database. Thus, these entries may be classified into one or more classes according to their timestamps.

In step S403, a key contained in each entry in each of the classes is extracted.

As described above, each class might comprise one or more entries. Thus, for each class, a key contained in each of various entries in this class may be extracted according to the implementations shown in FIGS. 2 and 3. Alternatively, other appropriate approaches available to those skilled in the art may also be used for extracting a key contained in each entry in each class.

In step S404, the relationship among keys in each of the classes is determined, and the keys in each of the classes are grouped into at least one group based on the relationship.

For keys extracted from the classes, the relationship among them may be determined by embodiments similar to those shown in FIGS. 2 and 3, and these keys may be grouped into at least one group based on the relationship, which is not detailed here.

In step S405, a schema associated with each of the classes is generated according to the at least one group.

Since in step S404 keys in each class are grouped into at least one group, in step S405 these groups used for generating a schema are groups associated with each class, rather than groups associated with all data in the non-relational database. Accordingly, the schema generated according to the at least one group is not a schema of the whole non-relational database but a schema associated with each class.

As shown in FIG. 9, schema 1 is the generated schema associated with the class "data of the $1^{st}$ day," schema 2 is the generated schema associated with the class "data of the $2^{nd}$ day," schema 3 is the generated schema associated with the class "data of the $3^{rd}$ day," . . . , and schema N is the generated schema associated with the class "data of the $N^{th}$ day."

In step S406, the similarity between schemas associated with the classes is calculated.

According to the embodiments of the present invention, for every two classes, schemas associated with each of the classes may be generated in step S405, e.g., schema 1 and schema 2 in FIG. 9, and then the similarity between schema 1 and schema 2 may be calculated in step S406.

The similarity between schemas associated with each class may be calculated by Angle Cosine, Dace coefficient, Chi-square, Log Likelihood Ratio, Class F1 measure or any other appropriate similarity calculation methods that are known to those skilled in the art.

In step S407, schemas whose similarity is greater than a predetermined similarity threshold are merged.

If the similarity between two schemas is relatively large, e.g., greater than a predetermined similarity threshold, then this might indicate that structures of the two schemas are close to each other, i.e., the structural change of the non-relational database is relatively slight in time periods associated with the two schemas. Thus, the two schemas may be merged so as to improve the schema of the database. Accordingly, if the similarity between two schemas is relatively small, then this might indicate that the structural difference of the non-relational database in a time period associated with the two schemas is relatively large. Thus, the two schemas do not need to be merged, so as to reduce system overheads and improve the operational efficiency.

FIG. 5 shows a schematic block diagram of an apparatus 500 for generating a schema of a non-relational database according to one exemplary embodiment of the present invention.

According to the embodiments of the present invention, apparatus 500 may comprise: a determiner 510 configured to determine relationship among keys in at least one entry of a non-relational database; a grouper 520 configured to group the keys into at least one group based on the determined relationship; and a generator 530 configured to generate a schema of the non-relational database according to the at least one group.

According to the embodiments of the present invention, the determiner 510 may include: a first extracting unit configured to extract a key contained in each entry of the at least one entry; a first determining unit configured to determine hierarchical information of the extracted key in the each entry; and a second determining unit configured to determine association relationship among the keys according to the hierarchical information.

According to the embodiments of the present invention, the grouper 520 may include: a second extracting unit configured to extract association relationship among the keys from the determined relationship; and a first grouping unit configured to group keys having the association relationship into a same group.

According to the embodiments of the present invention, the generator 530 may include: a first obtaining unit configured to obtain an effective group and its weight in the at least one group; and a first generating unit configured to generate a schema of the non-relational database based on the effective group and its weight.

According to the embodiments of the present invention, the first obtaining unit of generator 530 may include: a third determining unit configured to determine repetitive groups in the at least one group; a first setting unit configured to setting the repetitive groups as an effective group, wherein a weight of the effective group is the number of the repetitive groups; and a second setting unit configured to set a non-repetitive group as an effective group, wherein a weight of the effective group is a preset weight, 1 for example.

According to the embodiments of the present invention, the first generating unit of generator 530 may include: a comparing unit configured to compare the weight with a predetermined weight threshold; a selecting unit configured to select one or more target groups from the effective groups according to a result of the comparison; and a second generating unit configured to generate a schema of the non-relational database based on the target groups.

According to the embodiments of the present invention, the determiner 510 may include: a fourth determining unit configured to determine a timestamp of each entry of the at least one entry; a classifying unit configured to classify the at least one entry into classes according to the timestamp; a third extracting unit configured to extract a key contained in each entry in each of the classes; and a fifth determining unit configured to determine association relationship among keys in each of the classes.

According to the embodiments of the present invention, the grouper 520 may include: a second grouping unit configured to group keys in each of the classes into at least one group based on the determined association relationship among the keys in each of the classes.

According to the embodiments of the present invention, the generator 530 may include: a third generating unit configured to generate a schema associated with the each of the classes according to the at least one group into which keys in the each of the classes are grouped; a calculating unit configured to calculate the similarity between schemas associated with the classes; and a merging unit configured to merge schemas whose similarity is greater than a predetermined similarity threshold.

According to the embodiments of the present invention, the apparatus 500 may optionally include: an obtainer (not shown) configured to obtain a historical schema of the non-relational database; and a merger (not shown) configured to merge the generated schema and the historical schema according to the similarity therebetween or merge the generated schema and the historical schema according to a timestamp of the generated schema and a timestamp of the historical schema.

It is to be understood that the component and optional sub-component of apparatus 500 described above with reference to FIG. 5 respectively correspond to the steps of any of methods 200, 300 and 400 described above with reference to FIGS. 2-4. As such, all features and operations described with respect to methods 200, 300 and 400 are also applicable to apparatus 500, which are hence not detailed here.

In particular, the division of the component and optional sub-component of apparatus 500 is not limiting but exemplary. For example, the function of a single component shown in FIG. 5 may be performed by a plurality of components. Instead, a plurality of components shown in this figure may be implemented by a single component. The scope of the present invention is not limited in this regard.

It is to be further understood that the component and sub-component comprised in apparatus 500 may be implemented in various forms, including software, hardware, firmware or any combination thereof. For example, in some embodiments each component of apparatus 500 may be implemented using software and/or firmware modules. Alternatively or additionally, the component of apparatus 500 may be implemented using hardware modules. For example, each component of apparatus 500 may be implemented as an integrated circuit (IC) chip or application-specific integrated circuit (ASIC). Each component of apparatus 500 may also be implemented as a system on chip (SOC). Other forms that are currently known or to be developed in future are also feasible. The scope of the present invention is not limited in this regard.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for generating a schema of a non-relational database, comprising:
    determining a relationship among keys in at least one entry of the non-relational database, wherein the keys are part of key/value pairs having a predefined separator used to separate a key and a value in each of the key value pairs, wherein the non-relational database has an identifier distinguishing the non-relational database from other non-relational databases, wherein the identifier is one of the keys, and wherein the value of at least one of the keys nests another key such that the relationship between the at least one key and the other key has a degree of association depending on a number of co-occurrences of the at least one key and the other key;
    grouping the keys into at least one group based on the determined relationship;
    generating the schema of the non-relational database according to the at least one group;
    obtaining a historical schema of the non-relational database by i) classifying data in the non-relational database into classes based on a time period when the data is generated, and ii) performing the determining, grouping and generating for each of the classes to obtain intermediate schema associated with each of the classes; and
    merging the schema and the historical schema when a similarity between the schema and the historical schema is greater than a predetermined similarity threshold, otherwise leaving the schema and the historical schema unmerged if the similarity is less than the predetermined similarity threshold to reduce system overhead associated with merging schemas with structural differences, and to thereby improve operational efficiency,
    wherein the schema generated of the non-relational database provides a structure of the non-relational database which enables data processing including data matching, data integration and data exchange, to be performed on a relational database and the non-relational database.

2. The method according to claim 1, wherein determining the relationship among the keys in the at least one entry of the non-relational database comprises:
    extracting a key contained in each entry of the at least one entry by determining the key/value pairs contained in the each entry and extracting the key from the key/value pairs;
    determining hierarchical information of the key extracted in the each entry; and
    determining an association relationship among the keys according to the hierarchical information.

3. The method according to claim 1, wherein grouping the keys into the at least one group based on the determined relationship comprises:
    extracting an association relationship among the keys from the determined relationship; and
    grouping the keys having the association relationship into a same group.

4. The method according to claim 1, wherein generating the schema of the non-relational database according to the at least one group comprises:
    obtaining an effective group and a weight of the effective group in the at least one group; and
    generating the schema of the non-relational database based on the effective group and its weight.

5. The method according to claim 4, wherein obtaining the effective group and the weight of the effective group in the at least one group comprises:
    determining repetitive groups in the at least one group;
    setting the repetitive groups as an effective group, wherein the weight of the effective group is a number of the repetitive groups; and
    setting a non-repetitive group as an effective group, wherein the weight of the effective group is a preset weight.

6. The method according to claim 4, wherein generating the schema of the non-relational database based on the effective group and the weight of the effective group comprises:
    comparing the weight of the effective group with a predetermined weight threshold;
    selecting one or more target groups from the effective groups according to a result of comparing the weight of the effective group with a predetermined weight threshold; and
    generating the schema of the non-relational database based on the target groups.

7. The method according to claim 1, wherein determining the relationship among keys in the at least one entry of the non-relational database comprises:
    determining a timestamp of each entry of the at least one entry;
    classifying the at least one entry into the classes according to the timestamp;
    extracting a key contained in each entry in each of the classes; and
    determining association relationships among keys in each of the classes.

8. The method according to claim 7, wherein grouping the keys into the at least one group based on the determined relationship comprises:
    grouping keys in each of the classes into at least one group based on the association relationships determined among the keys in each of the classes.

9. The method according to claim 8, wherein the generating the schema of the non-relational database according to the at least one group comprises:
    generating a schema associated with the each of the classes according to the at least one group into which the keys in the each of the classes are grouped;
    calculating a similarity between schemas associated with the classes; and
    merging schemas whose similarity is greater than the predetermined similarity threshold.

10. The method according to claim 1, further comprising:
merging the schema generated of the non-relational database and the historical schema according to the similarity therebetween.

11. An apparatus for generating a schema of a non-relational database, comprising:
a memory; and
at least one processing unit, coupled to the memory, which implements:
a determiner configured to determine a relationship among keys in at least one entry of the non-relational database, wherein the keys are part of key/value pairs having a predefined separator used to separate a key and a value in each of the key value pairs, wherein the non-relational database has an identifier distinguishing the non-relational database from other non-relational databases, and wherein the identifier is one of the keys, and wherein the value of at least one of the keys nests another key such that the relationship between the at least one key and the other key has a degree of association depending on a number of co-occurrences of the at least one key and the other key;
a grouper configured to group the keys into at least one group based on the determined relationship;
a generator configured to generate the schema of the non-relational database according to the at least one group;
an obtainer configured to obtain a historical schema of the non-relational database, wherein the historical schema are obtained by i) classifying data in the non-relational database into classes based on a time period when the data is generated, and ii) using the determiner, the grouper and the generator to obtain intermediate schema associated with each of the classes; and
a merger configured to merge the schema and the historical schema when a similarity between the schema and the historical schema is greater than a predetermined similarity threshold, otherwise leaving the schema and the historical schema unmerged if the similarity is less than the predetermined similarity threshold to reduce system overhead associated with merging schemas with structural differences, and to thereby improve operational efficiency,
wherein the schema generated of the non-relational database provides a structure of the non-relational database which enables data processing including data matching, data integration and data exchange, to be performed on a relational database and the non-relational database.

12. The apparatus according to claim 11, wherein the determiner comprises:
a first extracting unit configured to extract a key contained in each entry of the at least one entry by determining the key/value pairs contained in the each entry and extracting the key from the key/value pairs;
a first determining unit configured to determine hierarchical information of the key extracted in the each entry; and
a second determining unit configured to determine an association relationship among the keys according to the hierarchical information.

13. The apparatus according to claim 11, wherein the grouper comprises:
a second extracting unit configured to extract an association relationship among the keys from the determined relationship; and
a first grouping unit configured to group the keys having the association relationship into a same group.

14. The apparatus according to claim 11, wherein the generator comprises:
a first obtaining unit configured to obtain an effective group and a weight of the effective group in the at least one group; and
a first generating unit configured to generate the schema of the non-relational database based on the effective group and the weight of the effective group.

15. The apparatus according to claim 14, wherein the first obtaining unit comprises:
a third determining unit configured to determine repetitive groups in the at least one group;
a first setting unit configured to set the repetitive groups as an effective group, wherein the weight of the effective group is a number of the repetitive groups; and
a second setting unit configured to set a non-repetitive group as an effective group, wherein the weight of the effective group is a preset weight.

16. The apparatus according to claim 14, wherein the first generating unit comprises:
a comparing unit configured to compare the weight of the effective group with a predetermined weight threshold;
a selecting unit configured to select one or more target groups from the effective groups according to a result of comparing the weight of the effective group with a predetermined weight threshold; and
a second generating unit configured to generate the schema of the non-relational database based on the target groups.

17. The apparatus according to claim 11, wherein the determiner comprises:
a fourth determining unit configured to determine a timestamp of each entry of the at least one entry;
a classifying unit configured to classify the at least one entry into the classes according to the timestamp;
a third extracting unit configured to extract a key contained in each entry in each of the classes; and
a fifth determining unit configured to determine association relationships among keys in each of the classes.

18. The apparatus according to claim 17, wherein the grouper comprises:
a second grouping unit configured to group keys in each of the classes into at least one group based on the association relationships determined among the keys in each of the classes.

19. The apparatus according to claim 18, wherein the generator comprises:
a third generating unit configured to generate a schema associated with the each of the classes according to the at least one group into which the keys in the each of the classes are grouped;
a calculating unit configured to calculate a similarity between schemas associated with the classes; and
a merging unit configured to merge schemas whose similarity is greater than the predetermined similarity threshold.

20. The apparatus according to claim 11, further comprising:
a merger configured to merge the schema generated of the non-relational database and the historical schema according to the similarity therebetween.

* * * * *